Feb. 18, 1936.  E. B. BOUGHTON  2,031,360
HYDRAULICALLY OR LIQUID PRESSURE OPERATED BRAKE
Filed May 29, 1933  2 Sheets-Sheet 1

INVENTOR
E. B. BOUGHTON
BY
ATTY.

Feb. 18, 1936.  E. B. BOUGHTON  2,031,360
HYDRAULICALLY OR LIQUID PRESSURE OPERATED BRAKE
Filed May 29, 1933   2 Sheets-Sheet 2

Inventor
E.B.Boughton
By Geo. Irvine
Atty

Patented Feb. 18, 1936

2,031,360

UNITED STATES PATENT OFFICE 2,031,360

HYDRAULICALLY OR LIQUID PRESSURE OPERATED BRAKE

Edward Bishop Boughton, London, England, assignor to Lockheed Hydraulic Brake Company, Limited, London, England Application May 29, 1933, Serial No. 673,527
In Great Britain June 4, 1932

4 Claims. (Cl. 60—54.6)

This invention relates to hydraulic brake systems, that is to say brake systems in which pressure applied to a brake lever is transmitted to the brake elements through the medium of a pressure liquid contained in a conduit of the kind in which, during brake application, a comparatively large diameter low pressure piston applies pressure to pressure-liquid in a brake conduit until, upon the attainment in said liquid of a predetermined pressure when the brake friction elements have been moved into contact with their drum or drums, or equivalent, pressure is applied to said liquid solely by a comparatively small diameter high pressure piston movable only as one with the low pressure piston. Various arrangements have been proposed whereby the low pressure piston is rendered inoperative in the application of pressure to the liquid, and the high pressure piston alone remaining operative, substantially as and when the brake elements come into contact with their drum as a result of the action of the low pressure piston upon the liquid. It has been proposed, for example, in a case where two coaxial pistons of different diameters serve, the one to take up play in a brake, and the other actually to apply the brake, to render the low pressure piston inoperative by means of a spring-controlled pressure release valve communicating with the low pressure cylinder. In most cases it has been the custom to permit liquid from the low pressure cylinder to pass during the presentation of the elements to their drum into the high pressure cylinder, and thence to the brake conduit through bores or grooves at the outer periphery of the high pressure piston and past the periphery of the usual cupped washer forming the seal of said piston, the cupped washer serving by itself to prevent return flow of liquid through such bores or grooves from the high pressure to the low pressure cylinder.

The object of the present invention is to provide improved means which, at the appropriate moment, shall render the high pressure piston alone to be operative in the impartation of pressure to the pressure liquid in the brake conduit.

An apparatus according to one form of the invention is illustrated by the accompanying diagrammatic drawings, in which there is also indicated a modification, and of which:

Figure 1:
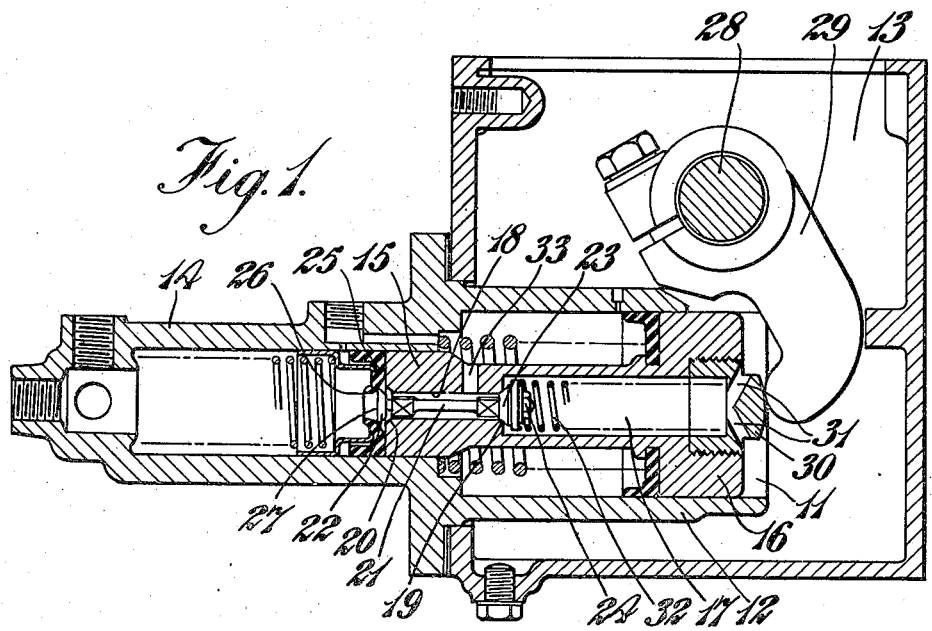
Figure 1 is a sectional elevation.
Figure 2:
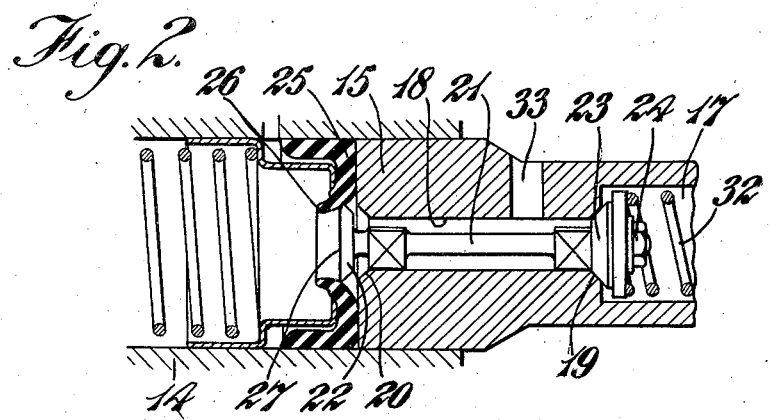
Figure 2 is a detail view drawn to a larger scale.

In accordance with this form of the invention, the rear end 11 of a low pressure cylinder 12 opens into a reservoir 13 for pressure liquid in the known manner, a high pressure cylinder 14 extending coaxially of the low pressure cylinder 12 from the forward end of the latter, whilst high and low pressure pistons 15 and 16, respectively, are formed as one with a bore 17, extending completely therethrough from end to end. Through the whole of the low pressure piston 16 this bore 17 is of comparatively large diameter, but within the high pressure piston 15 the bore 17 is of considerably reduced diameter; this reduced portion 18 of the bore 17 being hereinafter referred to as the "restriction" for the sake of brevity. As will be seen, however, this restriction 18 does not extend rearwardly to the forward face of the low pressure piston 16, and is formed at its rear end as a seating 19 for a valve; the restriction 18 being formed with a further valve seating 20 at its other end which is substantially level with the front face of the high pressure piston 15.

In this form a double ended valve is built up from two main parts, namely, a stem 21 formed integrally with one valve 22 as a "head", and another valve 23 adapted to be secured in position as shown at the other end of the stem 21 by means of a nut 24 in threaded relationship with the latter. The double valve 22, 23 is placed in position by inserting the stem 21 into the high pressure piston end of the bore 17 until the threaded end of the stem 21 extends beyond the low pressure piston end of the restriction 18; then the valve 23 directed towards the valve 22 is passed over the threaded end of the stem 21 against a shoulder thereon, and is secured in this position by means of a nut 24. The valves 22, 23 of this double valve are thus rigidly connected as one at a distance apart slightly greater than the distance separating the valve seatings 19 and 20 at the ends of the restriction 18 in the bore 17. The usual rubber cupped washer, indicated at 25, of the high pressure piston 15 is formed with a central aperture, the margin, indicated at 26, of which bears against the peripheral margin of the outer face 27 of the valve 22.

An operating spindle 28 extends through the upper part of the liquid reservoir 13 in the known manner, and has fast thereon an operating lever 29, which, instead of bearing directly against the rear face of the low pressure piston 16, bears against a cap member 30 which, apart from apertures 31 therein, closes the corresponding end of the bore 17; and within the bore 17 there is inserted between this cap 30 and the corresponding end of the interconnected valves 22, 23 a coiled compression spring 32. The restriction 18 has a port 33 extending radially therefrom into the low pressure cylinder 12 at the front side of the low pressure piston 16, and through the apertures 31 in the cap 30 the bore 17 communicates with the reservoir 13. Thus, whilst the head valve 22 of the double valve 22, 23 controls liquid flow from one cylinder to the other, so the other valve 23 serves to control liquid flow from the low pressure cylinder 12 to the reservoir 13.

Normally, the spring 32 maintains the double valve 22, 23 in a position in which the head valve 22 is open and permits liquid flow between the cylinders 12 and 14, and in which the other valve 23 is closed preventing liquid flow therethrough from the reservoir 13 to the low pressure cylinder 12. It will be observed that normally, and also when the head valve 22 is closed, the inner margin 26 of the cupped washer 25 bearing on the outer face 27 of the head valve 22 prevents liquid flow from the high pressure cylinder 14 to the low pressure cylinder 12. The cupped washer 25 constitutes in this way a non-return valve closing the forward end of the restriction 18 against liquid flow from the high pressure cylinder 14.

In operation, the two pistons 15 and 16 are moved as one towards the forward ends of their cylinders 14, 12, respectively, and, as a result, liquid is caused to flow from the low pressure cylinder 12 through the radial port 33 into the restriction 18, past the open valve 22 and between the outer face 27 thereof and the corresponding part 26 of the cupped washer 25 into the high pressure cylinder 14 and brake conduit (not shown). This continues until the brake shoes or other elements (not shown) coming into contact with their drum (not shown) and all the slack in the system having been taken up, liquid ceases to flow from the restriction 18 into the high pressure cylinder 14. Immediately this liquid flow ceases the inner margin 26 of the cupped washer 25 seats again upon the outer face 27 of the valve 22, thus preventing from this instant liquid flow from the high pressure cylinder 14 to the restriction 18. Pressure then increases in the high pressure cylinder 14 and when this reaches a predetermined value according to the strength of the spring 32, the latter will yield and the interconnected valves 22, 23 will move to positions in which the valve 22 is seated to act in conjunction with the cupped washer 25 seating in turn upon its outer face to prevent liquid flow from the high to the low pressure cylinder; the other valve 23 being opened simultaneously to permit liquid flow from the low pressure cylinder 12, through the bore 17 and apertures 31, to the reservoir 13.

Figure 3:
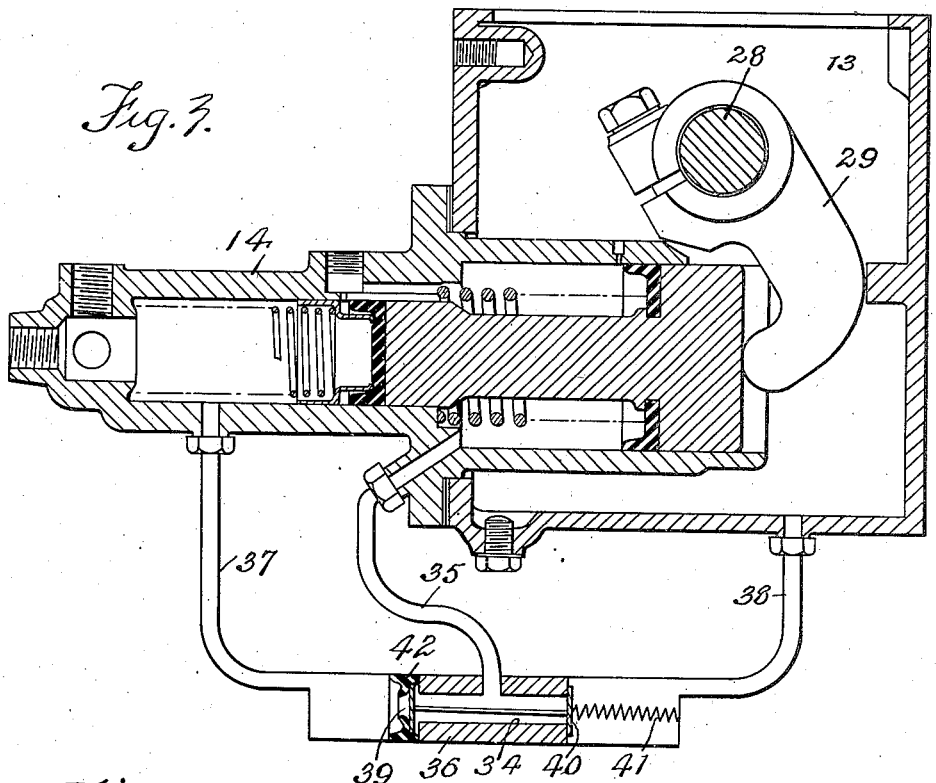
Figure 3 is a sectional view of a modification.
Figure 4:
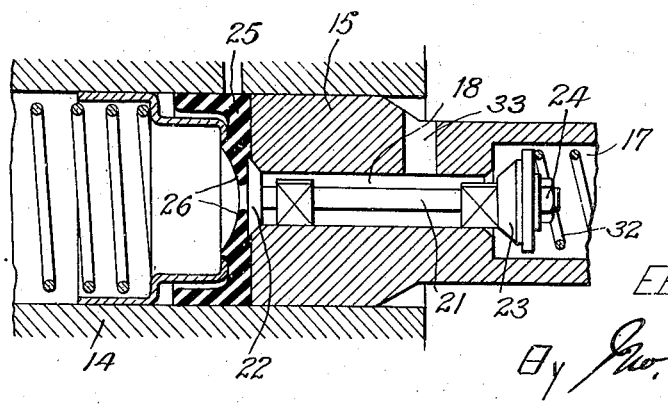
Figure 4 is a view in section, partly in elevation, showing the valve parts in brake-applying positions.

In some cases, as in Figure 3, the double valve 22, 23 together with an apertured elastic washer may be located in a "restriction" 34 connected intermediately of its length, as indicated at 35, with the low pressure cylinder, of a cylinder or other closed chamber 36 separate from the high and low pressure pistons and which is connected at one side of said restriction 34 with the high pressure cylinder, as indicated at 37, and at the other side with the reservoir, as indicated at 38. The three connections 35, 37 and 38 just mentioned may take the form of conduits, and what may be termed the control cylinder or equivalent 36 may be located in any convenient position, which may be at some considerable distance from the actual high and low pressure cylinders. In the drawings the interconnected valves in the restriction 34 are indicated at 39 and 40, their controlling spring at 41, and the elastic washer at 42.

It will be observed that whether or not the double valve and associated apertured elastic member be located within the double master piston, a separate liquid reservoir may be employed.

What I claim is:

1. A fluid pressure means for use in a hydraulic brake system of the type having a liquid reservoir, a high pressure cylinder, a low pressure cylinder, a passage therebetween, a communication between said reservoir and one end of said passage, communication between said high pressure cylinder and the other end of said passage, communication between said low pressure cylinder and said passage at a point intermediate said reservoir and high pressure communications with said passage, a double-valve unit spring-influenced to close normally by one end thereof said reservoir communication and movable in the passage to close by the other end thereof said high pressure cylinder communication and constituting a means closing the high pressure cylinder communication against liquid flow from the high pressure cylinder, an apertured elastic member normally cooperating at the margin of the aperture together with the other end of the double valve unit for valve closing function.

2. A fluid pressure means for use in a hydraulic brake system of the type having a liquid reservoir, a high pressure cylinder and piston, a low pressure cylinder and piston, a passage within and opening at the front face of the high pressure piston, communication between said reservoir and said passage, communication between the low pressure cylinder and said passage at a point intermediate the opening thereof at the front face of the high pressure piston and said low pressure cylinder communication with said passage, a double valve unit spring-influenced to close normally by one end thereof said reservoir communication and movable in the passage to close by the other end thereof the opening of said passage at the front face of the high pressure piston, and constituting a means closing the opening of the passage at the front of the high pressure piston against liquid flow from the high pressure cylinder, an apertured cupped washer of elastic material which normally cooperates at the margin of the aperture therein with said other end of said double-ended valve for valve closing function, said cupped washer having sealing co-operation with the front face of the high pressure piston and with the walls of the high pressure cylinder.

3. A fluid pressure means for use in a hydraulic brake system of the type having a liquid reservoir, coaxial high and low pressure cylinders, of which the latter opens at its rear end into said reservoir, integral coaxial high and low pressure pistons, a passage extending completely through said integral pistons from the front face of the former to the rear of the latter, a restriction in said passage extending from the neighborhood of the front end of the latter toward the rear end thereof, two oppositely directed valve seatings formed at the front and rear ends respectively of the restriction, one port extending from the restriction to the low pressure cylinder, a double valve unit extending through the restriction from end to end and having two oppositely directed faces corresponding with the seatings at the ends of the restriction, a coiled compression spring located in the passage in rear of the restriction and bearing at one end upon the rear end of the double valve, an apertured cap member at the rear end of the passage and constituting an abutment for the other end of said spring, and constituting a means closing the front end of the passage against liquid flow from the high pressure cylinder, an apertured elastic member at the front face of the high pressure piston which normally cooperates at the margin of the aperture therein with the front end of the double valve unit for valve closing function.

4. A fluid pressure means as in claim 1, wherein the double valve unit is operative in a restriction formed intermediate the length of a closed chamber connected at one side of the restriction with the high pressure cylinder and at the other with the reservoir.

EDWARD BISHOP BOUGHTON.